US009484145B2

(12) United States Patent
Liu et al.

(10) Patent No.: US 9,484,145 B2
(45) Date of Patent: Nov. 1, 2016

(54) CONVERTER

(75) Inventors: Teng Liu, Taoyuan Hsien (TW); Ke Dai, Taoyuan Hsien (TW); Ming-Hui Dai, Taoyuan Hsien (TW); Na Dong, Taoyuan Hsien (TW); Jian-Ping Ying, Taoyuan Hsien (TW)

(73) Assignee: DELTA ELECTRONICS, INC, Taoyuan (TW)

( * ) Notice: Subject to any disclaimer, the term of this patent is extended or adjusted under 35 U.S.C. 154(b) by 1058 days.

(21) Appl. No.: 13/555,722

(22) Filed: Jul. 23, 2012

(65) Prior Publication Data

US 2013/0308348 A1  Nov. 21, 2013

(30) Foreign Application Priority Data

May 15, 2012 (CN) .......................... 2012 1 0166393

(51) Int. Cl.
*H01F 5/00* (2006.01)
*H01F 27/28* (2006.01)
*H01F 27/34* (2006.01)
*H01F 27/40* (2006.01)
*H01F 38/42* (2006.01)
*H02M 3/335* (2006.01)

(52) U.S. Cl.
CPC ............ *H01F 27/346* (2013.01); *H01F 27/40* (2013.01); *H01F 38/42* (2013.01); *H01F 2027/2819* (2013.01); *H02M 3/335* (2013.01)

(58) Field of Classification Search
CPC .................................. H01F 5/00; H01F 27/28
USPC .................................................. 336/200, 232
See application file for complete search history.

(56) References Cited

U.S. PATENT DOCUMENTS

| 6,211,767 B1 * | 4/2001 | Jitaru ................... H01F 27/2804 336/200 |
| 6,501,233 B1 * | 12/2002 | Odell ..................... H05B 37/02 315/294 |
| 2010/0164670 A1 | 7/2010 | Nakahori et al. |
| 2011/0032683 A1 * | 2/2011 | Li ......................... H05K 7/1432 361/760 |
| 2011/0050379 A1 | 3/2011 | Kim |

FOREIGN PATENT DOCUMENTS

| CN | 1227660 A | 9/1999 |
| CN | 201081806 Y | 7/2008 |
| CN | 201084533 Y | 7/2008 |
| CN | 201138608 Y | 10/2008 |
| CN | 101533705 A | 9/2009 |
| CN | 101859638 A | 10/2010 |
| CN | 102237187 A | 11/2011 |
| CN | 102243918 A | 11/2011 |

(Continued)

*Primary Examiner* — Tsz Chan
(74) *Attorney, Agent, or Firm* — CKC & Partners Co., Ltd.

(57) ABSTRACT

A converter includes a transformer module, a primary side circuit module, and a secondary side circuit module. The transformer module includes a magnetic core group and a winding. The winding includes a primary winding and a secondary winding, and is further installed on the magnetic core group. The primary side circuit module is coupled to the primary winding. The secondary side circuit module is coupled to the secondary winding. The primary side circuit modules or the secondary side circuit module has overlapping vertical projection area on a first plane with the winding, and the first plane is a plane in a horizontal direction of the winding.

18 Claims, 17 Drawing Sheets

(56) References Cited

FOREIGN PATENT DOCUMENTS

| | | |
|---|---|---|
| CN | 102360787 A | 2/2012 |
| TW | 231358 B | 10/1994 |
| TW | M317640 U | 8/2007 |
| TW | M362499 U | 8/2009 |
| TW | 201209860 A | 3/2012 |
| TW | 201214477 A | 4/2012 |
| TW | 201222582 A | 6/2012 |
| WO | 2011152686 A2 | 12/2011 |

* cited by examiner

CONVERTER

RELATED APPLICATIONS

This application claims priority to China Patent Application Serial Number 201210166393.4, filed May 15, 2012, which is herein incorporated by reference.

BACKGROUND

1. Field of Invention

The present disclosure relates to a converter in the power electronics field. More particularly, the present disclosure relates to a converter including a planar transformer.

2. Description of Related Art

In comparison with a traditional transformer, a planar transformer utilizes a single layer or plural layers of printed circuit boards (PWB), copper foil and the like materials, instead of copper conducting wires of the traditional transformer. Conducting wires of the planar transformer are actually planar conductors, such that current tends to flow away from the center and flow along the boundary, but all of the currents still flow through the conductor, thereby obtaining a high current density. Additionally, due to the small volume, the large area, the flat shape and the good heat dissipation effect of a magnetic core used by the planar transformer, a higher efficiency may be obtained. Furthermore, due to the compact structure, the good coupling, the excellent insulating performance and the like advantages of the planar transformer, the planar transformer is adapted for product minimization. Thus, the planar transformer has been applied in many products, such as a power converter.

FIG. 1 illustrates a schematic circuit diagram of the power converter including the planar transformer.

It can be seen from FIG. 1 that the power converter 1 includes a planar transformer 11, a secondary side circuit module 12 and a primary circuit module 13. The secondary side circuit module 12 and the primary circuit module 13 are separately coupled to a secondary side and a primary side of the planar transformer 11.

FIG. 2 illustrates a schematic structure diagram of the power converter having the traditional planar transformer.

The planar transformer 11 includes a magnetic core group and a winding (not shown). The secondary side circuit module 12 is connected with the winding by a secondary side outgoing wire. The primary circuit module 13 is connected with the winding by a primary side outgoing wire.

However, for the traditional planar transformer 11, since a current loop composed of a winding outgoing wire and an external circuit module is capable of storing large magnetic field energy, a large leakage inductance is generated. For example, a loop composed of the secondary side outgoing wire of the winding and the secondary side circuit module 12 may generate a large leakage inductance. The leakage inductance is an important indicator of the planar transformer. For example, when the leakage inductance exists in a switching power supply, turning off a switching element will generate a back electromotive force due to the function of the leakage inductance. The back electromotive force is likely to break down the switching element due to overvoltage. In addition, an oscillation circuit is formed from the leakage inductance, the external circuit and the distributed capacitors of the winding of the planar transformer, so as to generate oscillations and radiate electromagnetic energy outwardly, thereby resulting in electromagnetic interference. Moreover, for some transformers such as a flyback transformer, the leakage inductance further causes loss, thereby decreasing the efficiency of the flyback transformer.

In view of the above, many in the industry are endeavoring to find ways in which to design a converter, in which by changing a structure of the planar transformer, the magnetic field energy stored in the loop composed of the outgoing wire of the planar transformer and the external circuit thereof is decreased, so as to decrease the leakage inductance.

SUMMARY

The present disclosure provides a converter including a transformer module, a primary side circuit module and a secondary side circuit module. The transformer module includes a magnetic core group and a winding. The winding includes a primary winding and a secondary winding, and is further installed in the core group. The primary side circuit module is coupled to the primary winding of the transformer module. The secondary side circuit module is coupled to the secondary winding of the transformer module. The primary side circuit modules and/or the secondary side circuit module have an overlapping vertical projection area on a first plane with the winding of the transformer module, and the first plane is a plane in the horizontal direction of the winding.

BRIEF DESCRIPTION OF THE DRAWINGS

In order to make the following as well as other aspects, features, advantages, and embodiments of the present disclosure more apparent, the accompanying drawings are described as follows.

DETAILED DESCRIPTION

The present disclosure will be described in the following embodiments with reference to the accompanying drawing, but these embodiments are not intended to limit the present disclosure. The description of structure operation does not mean to limit its implementation order. Any device with equivalent functions that is produced from a structure formed by recombination of elements shall fall within the scope of the present disclosure. The drawings are only illustrative and are not made according to the original size.

Figure 3A:
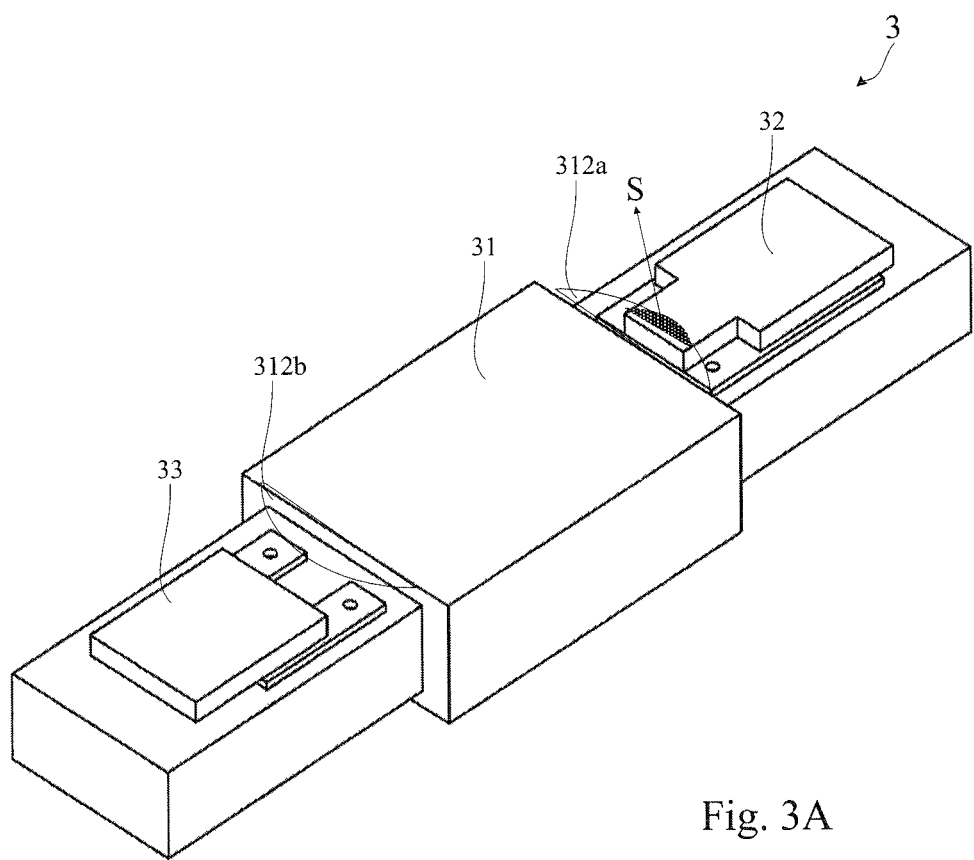
FIG. 3A illustrates a schematic structure diagram of a converter of the first embodiment of the present disclosure.
Figure 3B:
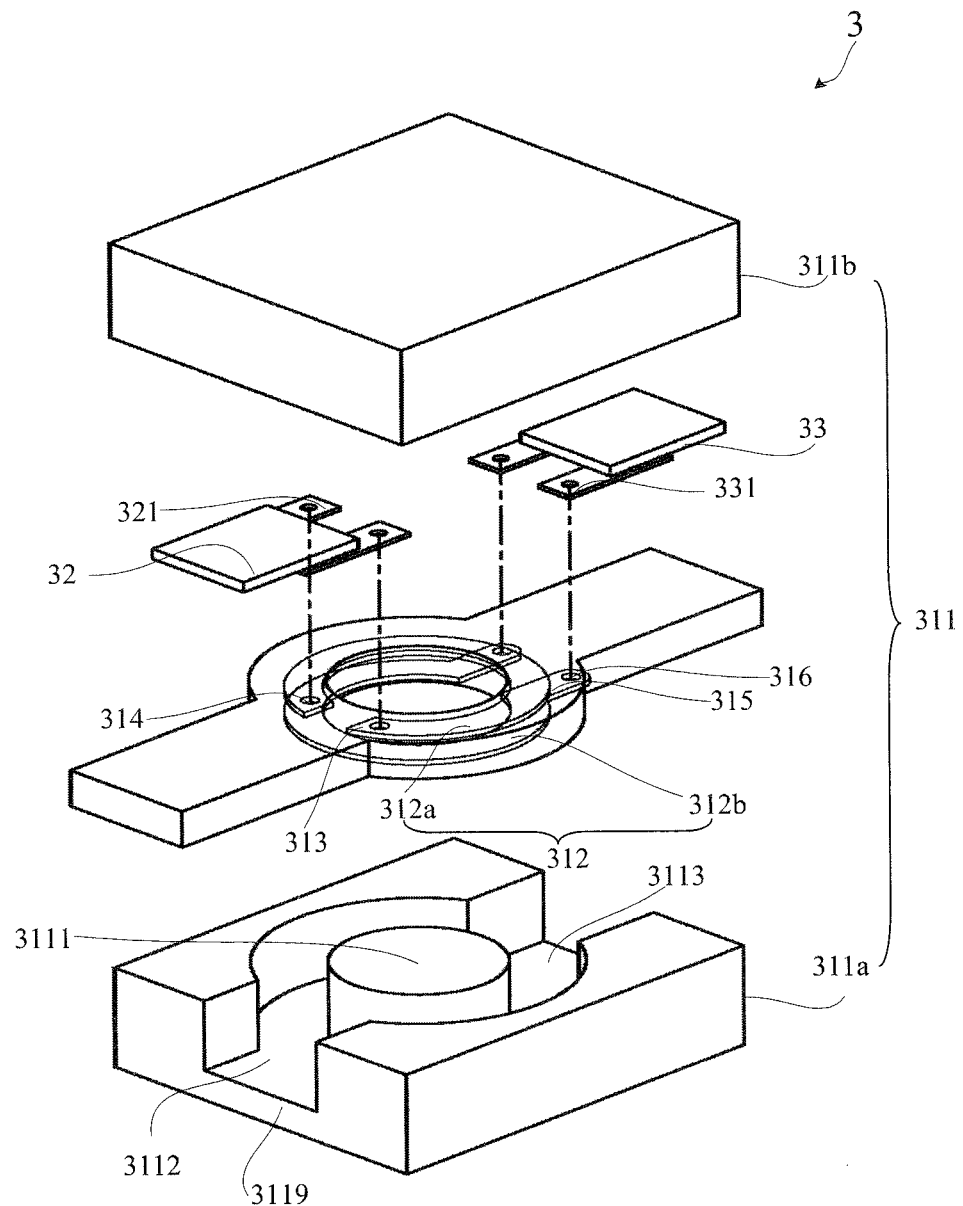
FIG. 3B illustrates an explosive view of the converter shown in FIG. 3A.

The First Embodiment:

Referring to FIGS. 3A and 3B, FIG. 3A illustrates a schematic structure diagram of a converter of the first embodiment of the present disclosure; FIG. 3B illustrates an explosive view of the converter shown in FIG. 3A.

As shown in FIGS. 3A and 3B, the converter 3 includes a transformer module 31, a secondary side circuit module 32 and a primary side circuit module 33.

The transformer module 31 includes a magnetic core group 311 and a winding 312. The magnetic core group 311 includes a first magnetic core component 311a and a corresponding second magnetic core component 311b. The first magnetic core component 311a has a magnetic core center pillar 3111, a secondary side opening 3112, a primary side opening 3113 and a magnetic core cover plate 3119. The winding 312 includes a secondary winding 312a and a primary winding 312b. The winding 312 is installed on the magnetic core group 311. Specifically, the winding 312 is installed between the first magnetic core component 311a and the second magnetic core component 311b, and further is set on the magnetic core center pillar 3111.

The secondary side circuit module 32 is coupled to the secondary winding 312a of the transformer module 31. The primary side circuit module 33 is coupled to the primary winding 312b of the transformer module 31.

Two ends of the secondary winding 312a are respectively coupled with the secondary side circuit module 32 by a secondary side outgoing wire. This secondary side outgoing wire includes a secondary side internal layer outgoing wire 313, a secondary side outgoing wire hole 314 and a secondary side external layer outgoing wire 321. The secondary side internal layer outgoing wire 313 is electrically connected with the secondary side external layer outgoing wire 321 through the secondary side outgoing wire hole 314. Similarly, two ends of the primary winding 312b are respectively coupled to the primary side circuit module 33 by a primary side outgoing wire. This primary side outgoing wire includes a primary side internal layer outgoing wire 315, a primary side outgoing wire hole 316 and a primary side external layer outgoing wire 331. The primary side internal layer outgoing wire 315 is electrically connected with the primary side external layer outgoing wire 331 through the primary side outgoing wire hole 316. The secondary side outgoing wire hole 314 may be arranged on an external area of the secondary winding 312a, but not limited thereto, the secondary side outgoing wire hole 314 may also be arranged in an area of the secondary winding 312a or in an area between the secondary winding 312a and the magnetic core center pillar 3111. Similarly, the primary side outgoing wire hole 316 may be arranged on an external area of the primary winding 312b, but not limited thereto, the primary side outgoing wire hole 316 may also be arranged in an area of the primary winding 312b or in an area between the primary winding 312b and the magnetic core center pillar 3111.

The vertical projection areas of both the first magnetic core component 311a and the second magnetic core component 311b of the magnetic core group 311 on the first plane have at least one non-covering area (a part of the vertical projection area of the winding 312 on the first plane not covered by the vertical projection area of the first magnetic core component 311a or the second magnetic core component 311b on the first plane is referred to as the non-covering area, and the non-covering area is located at the secondary side or the primary side) which does not cover the vertical projection area of the winding 312 on the first plane. The first plane is a plane in a horizontal direction of the winding 312a.

In this embodiment, the first magnetic core component 311a and the second magnetic core component 311b of the magnetic core group 311 are overlapped in the vertical projection area on the first plane. The vertical projection area of the first magnetic core component 311a and the second magnetic core component 311b on the first plane has a non-covering area (not shown) at the secondary side which does not cover the vertical projection area of the winding 312 on the first plane. Meanwhile, when moving towards a direction of the magnetic core center pillar 3111, the secondary side circuit module 32 is vertically projected within the non-covering area, so that the secondary side circuit module 32 has an overlapping vertical projection area S on the first plane with the winding 312 (specifically, the secondary winding 312a). Therefore, both the secondary side internal layer outgoing wire 313 and the secondary side external layer outgoing wire 321 have a decreased length, so that a secondary side outgoing wire loop composed of the secondary side circuit module 32, the secondary side external layer outgoing wire 321, the secondary side outgoing wire hole 314 and the secondary side internal layer outgoing wire 313 is decreased, thereby decreasing energy stored in a magnetic field generated by the secondary side outgoing wire loop and reducing the leakage inductance.

In another embodiment, the transformer module 31 may be a planar transformer. That is, the winding 312 thereof is a planar winding, such as a PCB (Printed Circuit Board) planar winding or a foil planar winding.

In this embodiment, only the secondary side circuit module 32 is illustrated, and this is because, due to the small number of turns of the secondary winding of the planar transformer, the leakage inductance of the secondary side outgoing wire often account for a high proportion in total leakage inductance of the planar transformer. However, in other embodiments, the vertical projection area of the first magnetic core component 311a and the second magnetic core component 311b on the first plane may also have a non-covering area at the primary side which does not cover the vertical projection area of the winding 312 on the first plane. The primary side circuit module 33 moves towards the magnetic core center pillar 3111 so that the primary side circuit module 33 has an overlapping vertical projection area on the first plane with the winding 312 (specifically, the primary winding 312b). Therefore, the leakage inductance generated by the primary side outgoing wire loop can be decreased. In other embodiments, the vertical projection area of the first magnetic core component 311a and the second magnetic core component 311b on the first plane may also have a non-covering area both at the secondary side and the primary side which does not cover the vertical projection area of the winding 312 on the first plane. The secondary side circuit module 32 and the primary side circuit module 33 move towards the magnetic core center pillar 3111 at the same time, so that the secondary side circuit module 32 and the primary side circuit module 33 have the overlapping vertical projection area on the first plane with the winding 312. Therefore, the leakage inductance generated by the secondary side outgoing wire loop and the primary side outgoing wire loop can be decreased.

Figure 4:
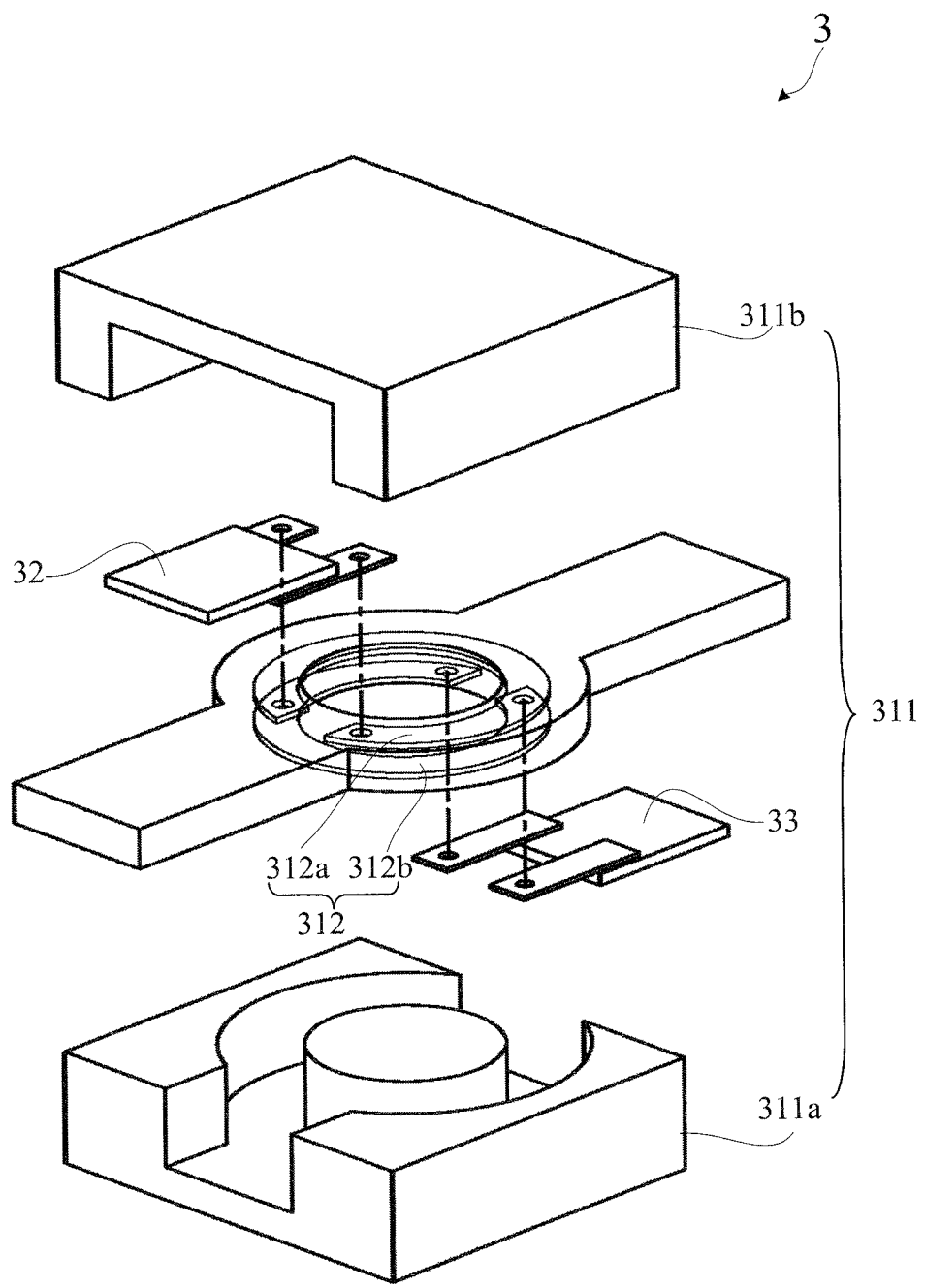
FIG. 4 illustrates an explosive view of the converter of the second embodiment of the present disclosure.

The Second Embodiment:

In this embodiment, the difference between this embodiment and the first embodiment lies in that the first magnetic core component 311a and the second magnetic core component 311b are not overlapped in the vertical projection area on the first plane. FIG. 4 illustrates an explosive view of the converter of the second embodiment of the present disclosure. The vertical projection area of the first magnetic core component 311a on the first plane has a non-covering area at the secondary side which does not cover the vertical projection area of the winding 312 on the first plane. Meanwhile, the vertical projection area of the second magnetic core component 311b on the first plane has a non-covering area at the primary side which does not cover the vertical projection area of the winding 312 on the first plane. At this moment, the secondary side circuit module 32 and the primary side circuit module 33 both move towards the magnetic core center pillar 3111, so that the secondary side circuit module 32 and the primary side circuit module 33 are respectively vertically projected within the non-covering area at the secondary side and the non-covering area at the primary side. Furthermore, the secondary side circuit module 32 and the primary side circuit module 33 respectively have the overlapping vertical projection area on the first plane with the winding 312. It can be seen from the figures that the secondary side circuit module 32 is located at the side of the second magnetic core component 311b and further moves towards the second magnetic core component 311b so that the secondary side circuit module 32 has an overlapping vertical projection area on the first plane with the secondary winding 312a. The primary side circuit module 33 is located at the side of the magnetic core cover plate 3119 of the first magnetic core component 311a, and further moves towards the first magnetic core component 311a, so that the primary side circuit module 33 has the overlapping vertical projection area on the first plane with the primary winding 312b. It should be noted that in other embodiments, the secondary side circuit module 32 may be located at the side of the magnetic core cover plate 3119 of the first magnetic core component 311a, or alternatively the primary side circuit module 33 may be located at the side of the second magnetic core component 311b, but the present disclosure is not limited thereto. Therefore, the leakage inductance generated by the secondary side outgoing wire loop and/or the primary side outgoing wire loop may be decreased.

Figure 5A:
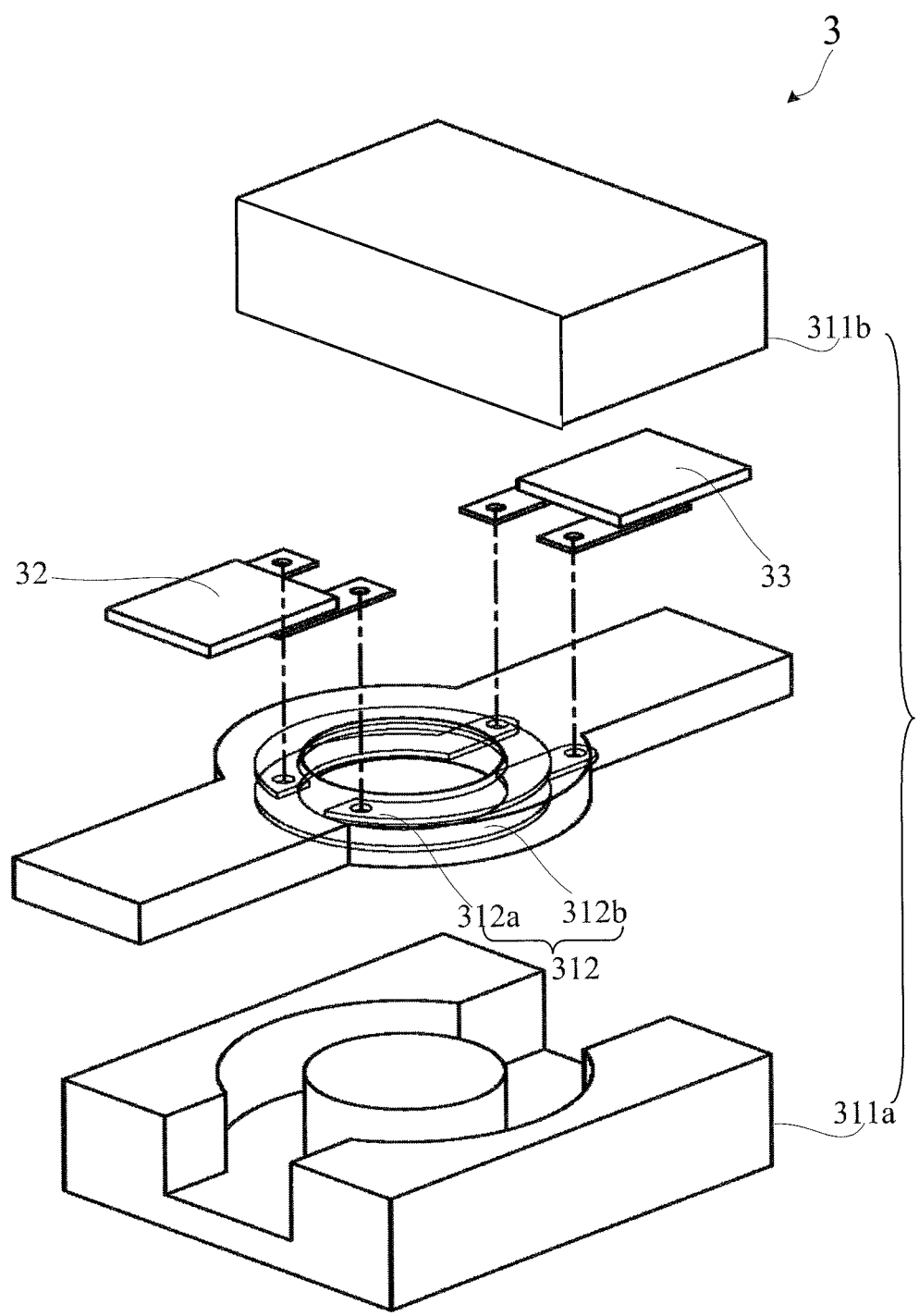
FIG. 5A illustrates an explosive view of the converter of the third embodiment of the present disclosure.
Figure 5B:
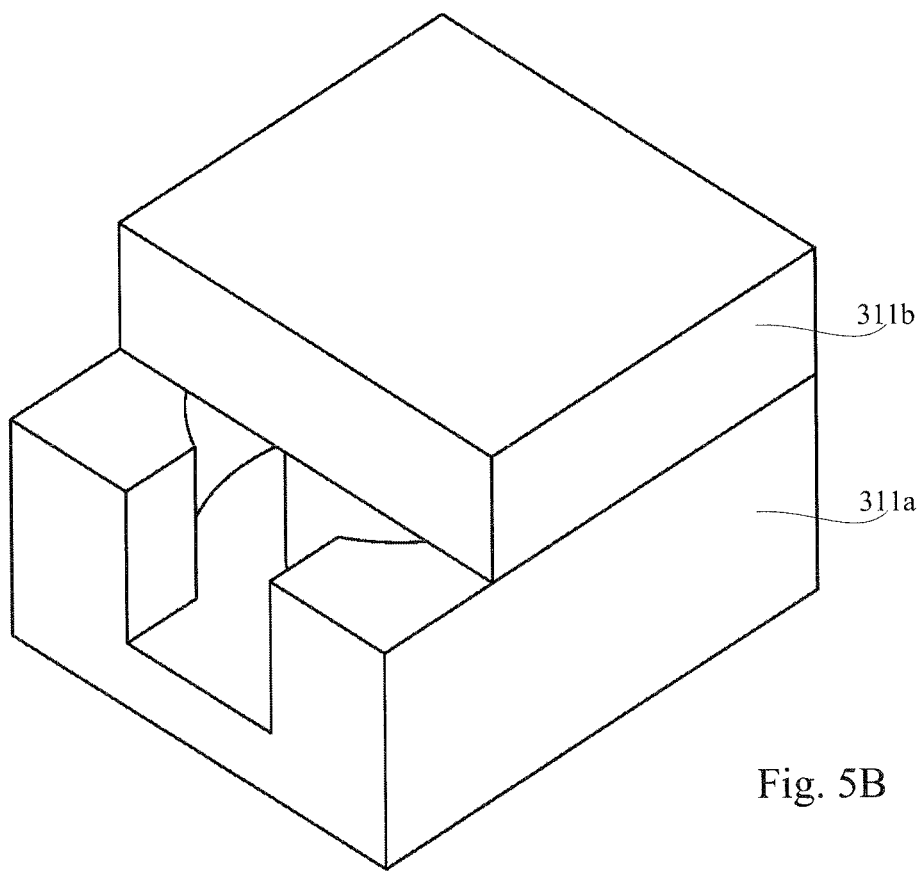
FIG. 5B illustrates a schematic diagram of a magnetic core group of the converter shown in FIG. 5A.

The Third Embodiment:

Referring to FIGS. 5A and 5B, FIG. 5A illustrates an explosive view of the converter of the third embodiment of the present disclosure; and FIG. 5B illustrates a schematic diagram of the magnetic core group of the converter shown in FIG. 5A.

In this embodiment, the vertical projection area of the first magnetic core component 311a on the first plane fully covers the vertical projection area of the winding 312 on the first plane, while the vertical projection area of the second magnetic core component 311b on the first plane has a non-covering area which does not cover the vertical projection area of the winding 312 on the first plane. Alternatively, the vertical projection area of the second magnetic core component 311b on the first plane fully covers the vertical projection area of the winding 312 on the first plane, while the vertical projection area of the first magnetic core component 311a on the first plane has a non-covering area which does not cover the vertical projection area of the winding 312 on the first plane, but the present disclosure is not limited thereto. It can be seen from the figures that the vertical projection area of the first magnetic core component 311a on the first plane fully covers the vertical projection area of winding 312 on the first plane. At this moment, the second magnetic core component 311b has a non-overlapping vertical projection area (not shown) at the secondary side on the first plane with the winding 312. That is, a part of the vertical projection area of the winding 312 on the first plane is not covered by the vertical projection area of the second magnetic core component 311b on the first plane, which is referred to as the non-overlapping vertical projection area. For example, a partial vertical projection area of the winding 312 on the first plane is not covered by the vertical projection area of the second magnetic core component 311b on the first plane. The secondary side circuit module 32 moves towards the second magnetic core component 311b, so that at least one part of the secondary side circuit module 32 is vertically projected within the non-covering area, and moreover, the secondary side circuit module 32 has an overlapping vertical projection area on the first plane with the winding 312, thereby decreasing the leakage inductance generated by the secondary side outgoing wire loop. It should be noted that in some other embodiments, the second magnetic core component 311b may also have the non-overlapping vertical projection area at the primary side on the first plane with the winding 312. The primary side circuit module 33 moves towards the second magnetic core component 311b, so that at least one part of the primary side circuit module 33 is vertically projected within the non-covering area, and moreover, the primary side circuit module 33 has an overlapping vertical projection area on the first plane with the winding 312, thereby decreasing the leakage inductance generated by the primary side outgoing wire loop.

Figure 6:
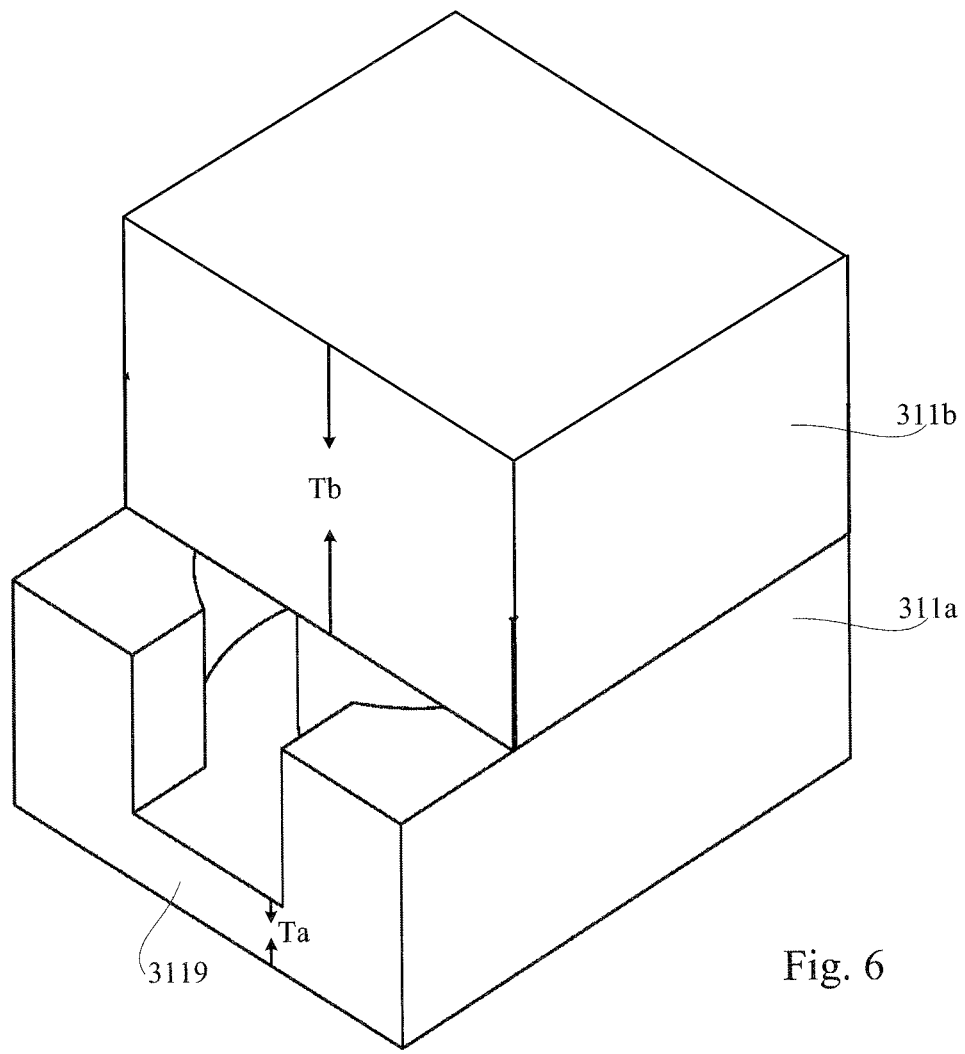
FIG. 6 illustrates a schematic structure diagram of the magnetic core group of the fourth embodiment of the present disclosure.

The Fourth Embodiment:

FIG. 6 illustrates a schematic structure diagram of the magnetic core group of the fourth embodiment of the present disclosure.

The difference between this embodiment and the third embodiment lies in that the magnetic core cover plate 3119 of the first magnetic core component 311a has a thickness Ta which is smaller than the thickness Tb of the second magnetic core component 311b. With adoption of this magnetic core group structure, in a comparison between this embodiment and the third embodiment, the magnetic core structure has lower magnetic core loss than that of the magnetic core structure shown in FIG. 5B with the same magnetic core material. In other embodiments, the magnetic core cover plate 3119 of the first magnetic core component 311a may also have a thickness greater than that of the second magnetic core component 311b, thereby decreasing the loss of the magnetic core.

Figure 7:
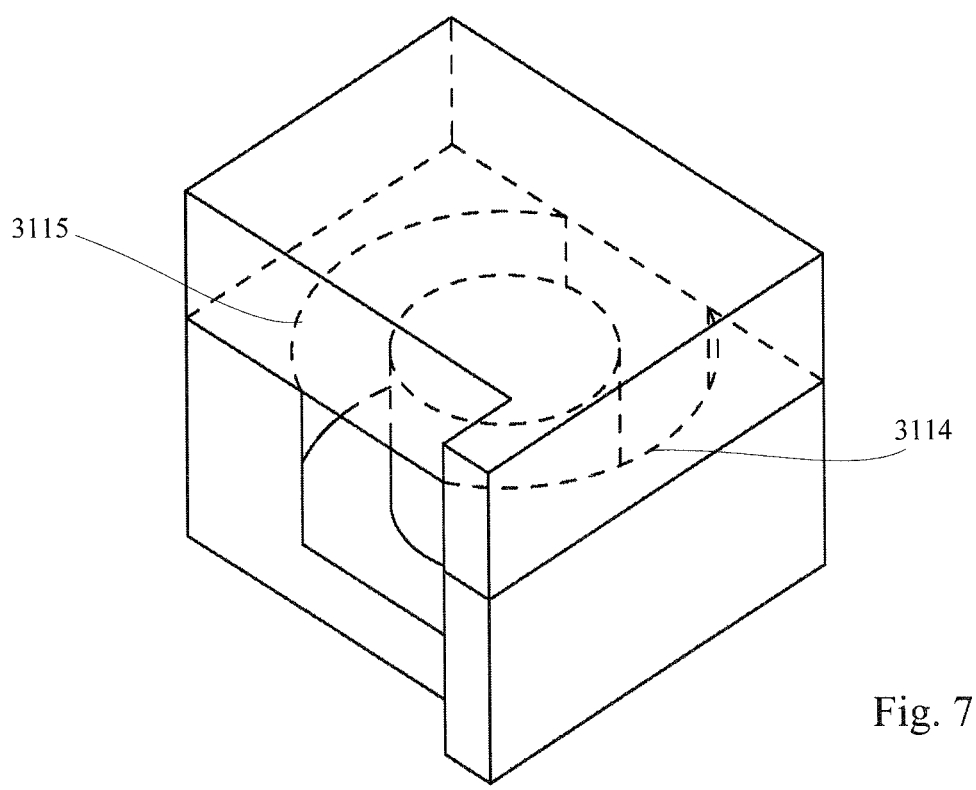
FIG. 7 illustrates a schematic structure diagram of the magnetic core group of the fifth embodiment of the present disclosure.

The Fifth Embodiment:

FIG. 7 illustrates a schematic structure diagram of the magnetic core group of the fifth embodiment of the present disclosure.

The difference between this embodiment and the first embodiment lies in that for the magnetic core group 311, a side pillar 3114 is asymmetrical with a side pillar 3115 with respect to the magnetic core center pillar 3111. It can be seen from the figures that for the magnetic core group 311, the side pillar 3114 has a length different from that of the side pillar 3115. That is, the side pillar 3114 is longer than the side pillar 3115. In this way, it facilitates preparation of the primary side outgoing wire hole or the secondary side outgoing wire hole, is convenient for wiring of the primary side circuit module or the secondary side circuit module, and is useful to decrease the volume of the converter and decrease the leakage inductance generated by the primary side outgoing loop or the secondary side outgoing wire loop.

Figure 8:
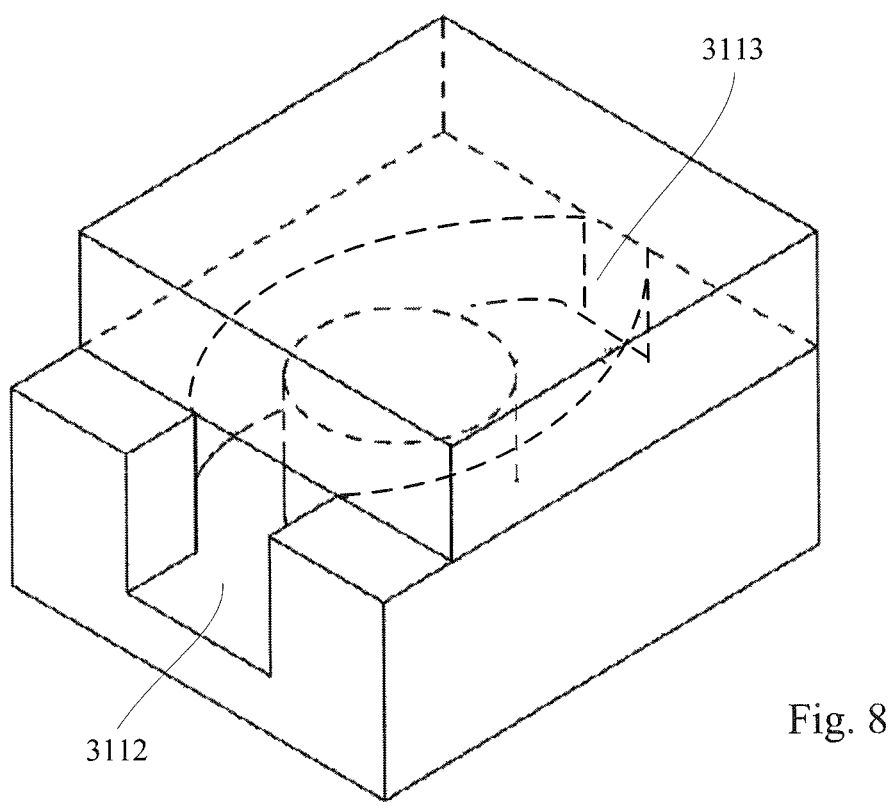
FIG. 8 illustrates a schematic structure diagram of the magnetic core group of the sixth embodiment of the present disclosure.

The Sixth Embodiment:

FIG. 8 illustrates a schematic structure diagram of the magnetic core group of the sixth embodiment.

In this embodiment, based on the third, the fourth and the fifth embodiments, the secondary side opening 3112 of the magnetic core group 311 is asymmetrical with the primary side opening 3113 with respect to the magnetic core center pillar 3111. Specifically, both the side pillars 3114 and 3115 of the magnetic core may extend along the arc of the magnetic core towards the primary side opening 3113, which increases the volume of the side pillars 3114 and 3115 so as to decrease the magnetic core loss.

Figure 9A:
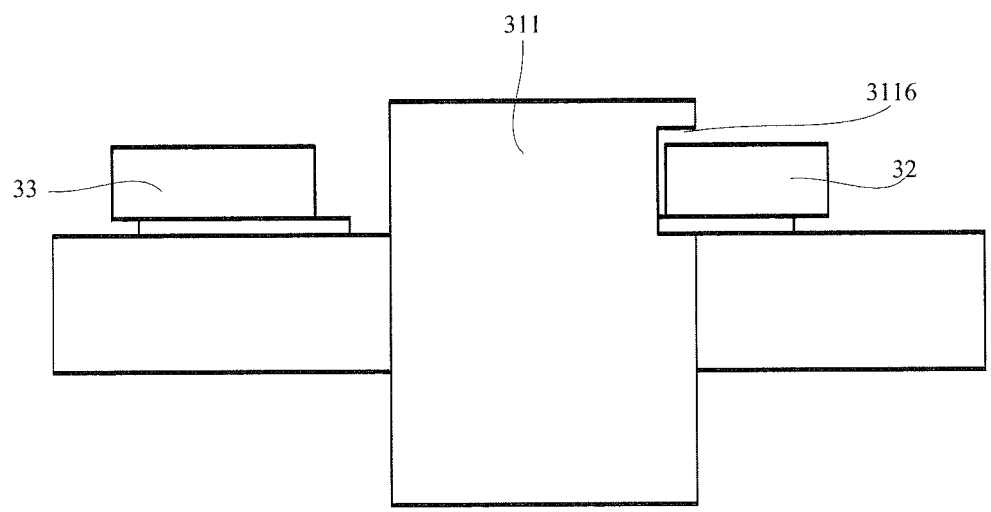
FIG. 9A illustrates a schematic structure diagram of the converter of the seventh embodiment of the present disclosure.
Figure 9B:
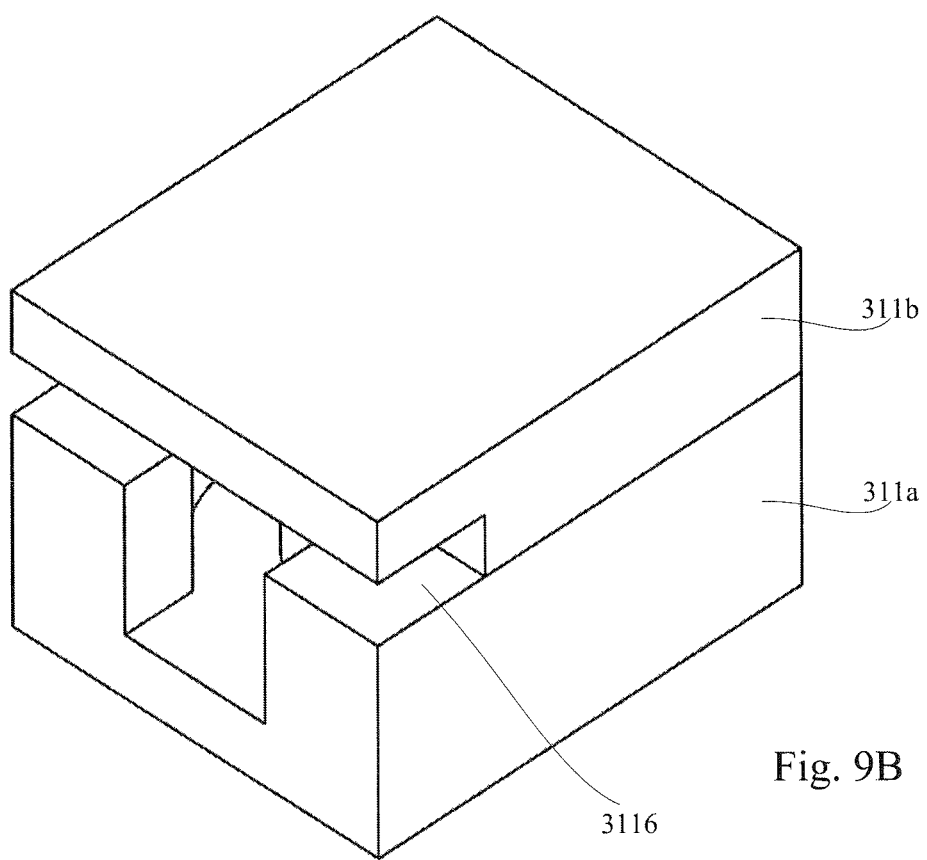
FIG. 9B illustrates a schematic structure diagram of the magnetic core group of the converter shown in FIG. 9A.

The Seventh Embodiment:

Referring to FIGS. 9A and 9B, FIG. 9A illustrates a schematic structure diagram of the converter of the seventh embodiment of the present disclosure; and FIG. 9B illustrates a schematic structure diagram of the magnetic core group of the converter shown in FIG. 9A.

In this embodiment, the vertical projection area of both the first magnetic core component 311a and the second magnetic core component 311b of the magnetic core component 311 on the first plane fully covers the vertical projection area of the winding on the first plane. A groove 3116 is defined in the second magnetic core component 311b of the magnetic core group 311, and one end of the secondary side circuit module 32 is accommodated in the groove 3116, so that the secondary side circuit module 32 has an overlapping projection area on the first plane with the winding, thereby decreasing the leakage inductance generated by the secondary side outgoing wire loop. It should be noted that in other embodiments, the groove may also be defined in the first magnetic core component 311a, and one end of the secondary side circuit module 32 is accommodated in the groove 3116, or alternatively, one end of the primary side circuit module 33 is accommodated in the groove, so as to decrease the leakage inductance generated by the primary side outgoing wire loop.

Figure 10:
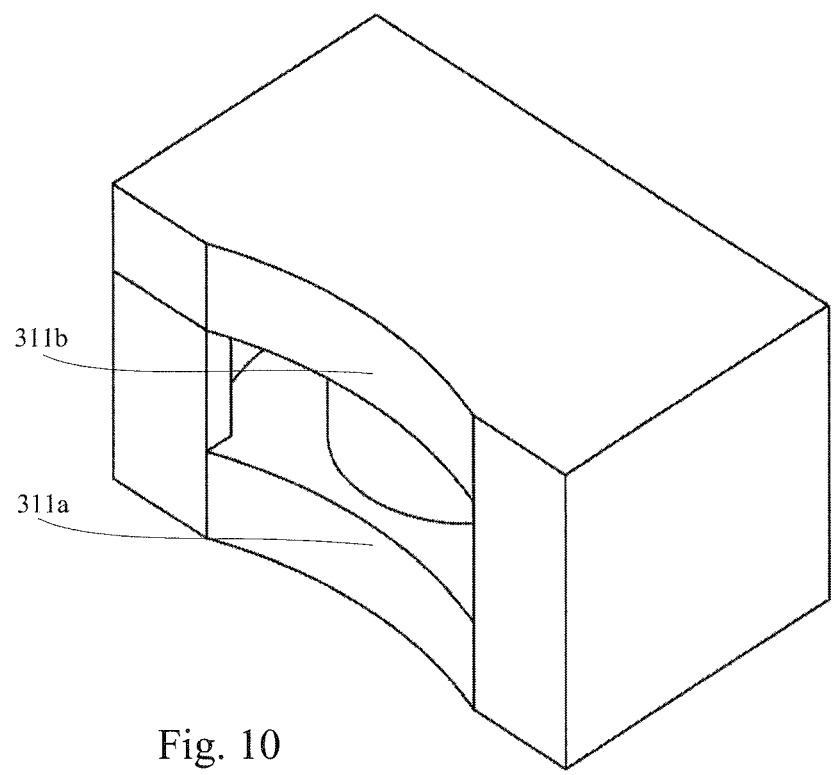
FIG. 10 illustrates a schematic structure diagram of the magnetic core group of the eighth embodiment of the present disclosure.

The Eighth Embodiment:

FIG. 10 illustrates a schematic structure diagram of the magnetic core group of the eighth embodiment of the present disclosure.

The difference between this embodiment and the first embodiment lies in that the first magnetic core component 311a and the second magnetic core component 311b are arc-shaped inwardly along the secondary side opening 3112 or the primary side opening 3113, so that the secondary side circuit module 32 or the primary side circuit module 33 moves correspondingly towards the magnetic core center pillar 3111. Therefore, not only the magnetic core loss can be decreased, but also the leakage inductance generated by the primary side outgoing wire loop can be decreased.

Figure 11:
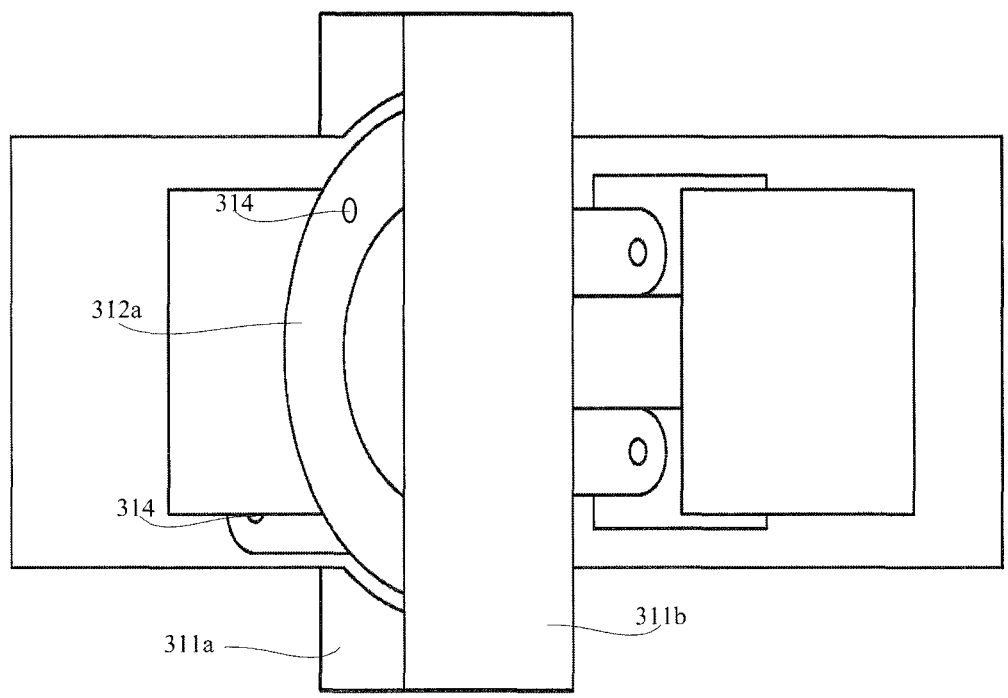
FIG. 11 illustrates a schematic structure diagram of the converter of the ninth embodiment of the present disclosure.

The Ninth Embodiment:

FIG. 11 illustrates a schematic structure diagram of the converter of the ninth embodiment of the present disclosure.

The difference between this embodiment and the third embodiment lies in that a secondary side outgoing wire hole 314 is disposed on an external area of the secondary winding 312a, while another secondary side outgoing wire hole 314 is disposed in an area of the secondary winding 312a, which facilitates the preparation of the secondary side outgoing wire hole.

Figure 12A:
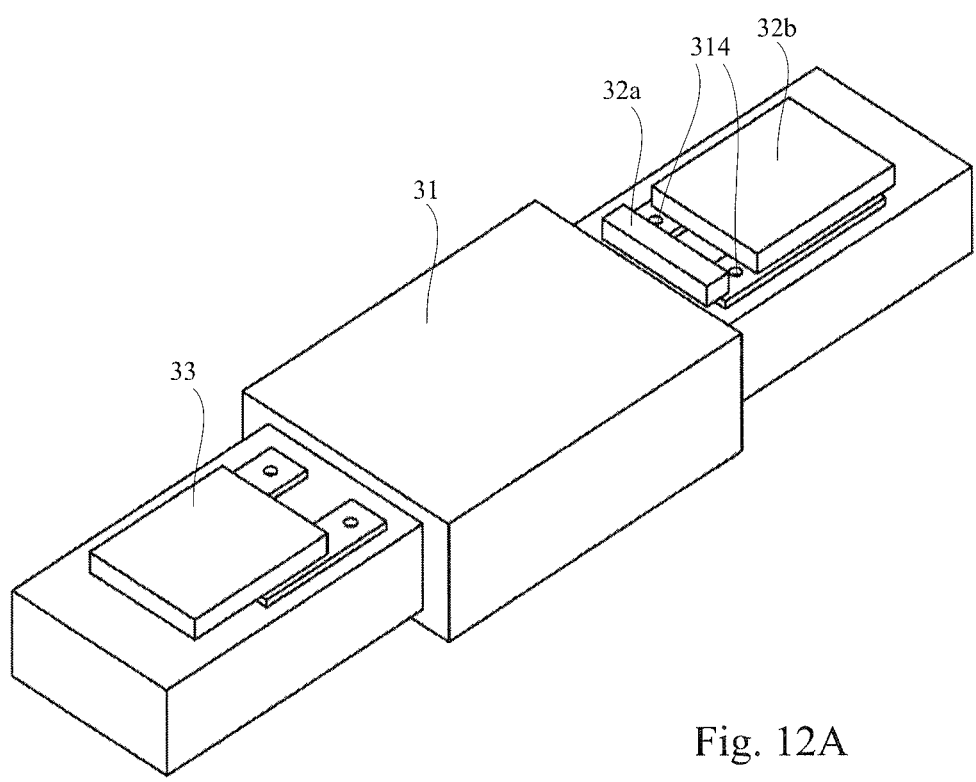
FIG. 12A illustrates a schematic structure diagram of the converter of the tenth embodiment of the present disclosure.

The Tenth Embodiment:

FIG. 12A illustrates a schematic structure diagram of the converter of the tenth embodiment of the present disclosure.

In this embodiment, the secondary side circuit module 32 is internally divided into two circuit modules 32a and 32b. The circuit module 32a includes an element sensitive to the leakage inductance, and the circuit module 32b includes an element insensitive to the leakage inductance. Moreover, the circuit module 32a is arranged at one side of the secondary side outgoing wire hole 314 close to the magnetic core group 31. For example, switching tubes, capacitors and the like are arranged at one side of the secondary side outgoing wire hole 314 close to the magnetic core group 31. The circuit module 32b is arranged at one side far from the magnetic core group 31.

Figure 12B:
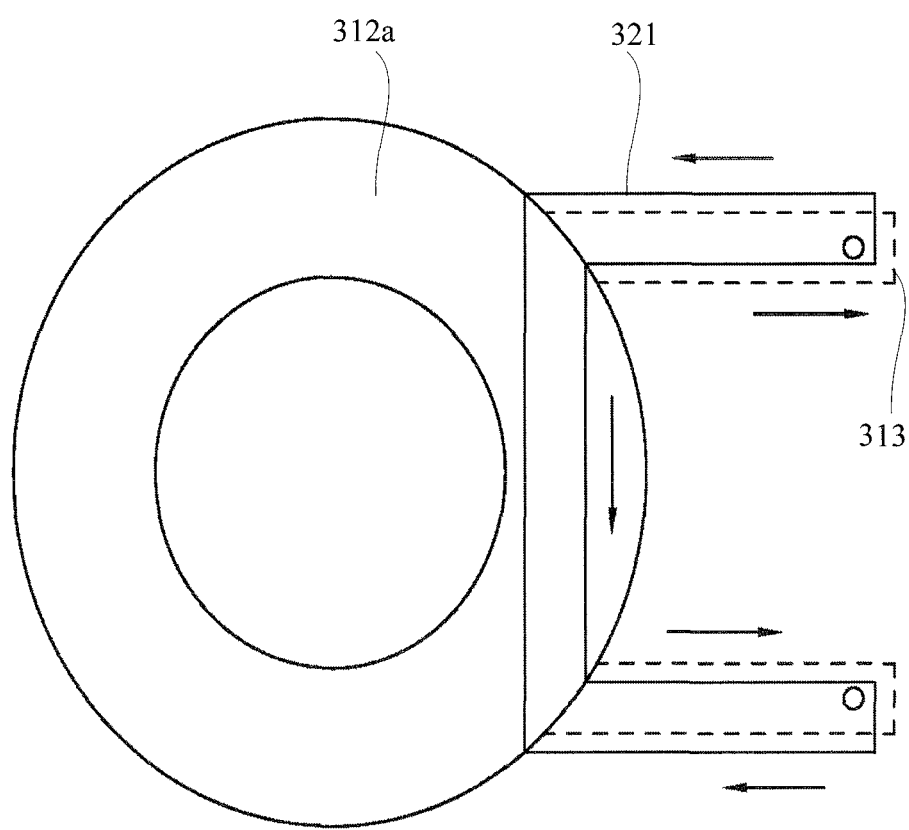
FIG. 12B illustrates a schematic principle diagram of a secondary side outgoing wire of a converter shown in FIG. 12A.

FIG. 12B illustrates a schematic principle diagram of the secondary side outgoing wire of the converter shown in FIG. 12A.

As shown in FIG. 12B, the secondary side external layer outgoing wire 321 is parallel with the secondary side internal layer outgoing wire 313, and since the current flowing through the secondary side external layer outgoing wire 321 is equal to that of the secondary side internal layer outgoing wire 313 and the current is flowing toward opposite directions in the two wires, the generated magnetic fields cancel out each other, so that the impact of the leakage inductance of the secondary side outgoing wire can be decreased greatly.

Figure 1:
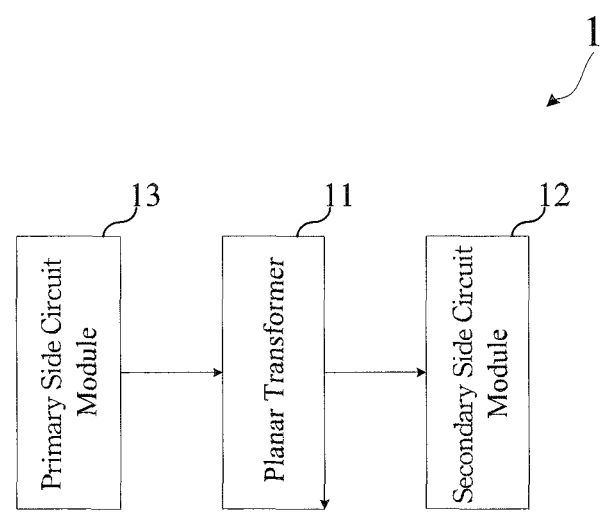
FIG. 1 illustrates a schematic circuit diagram of a power converter including a planar transformer.
Figure 2:
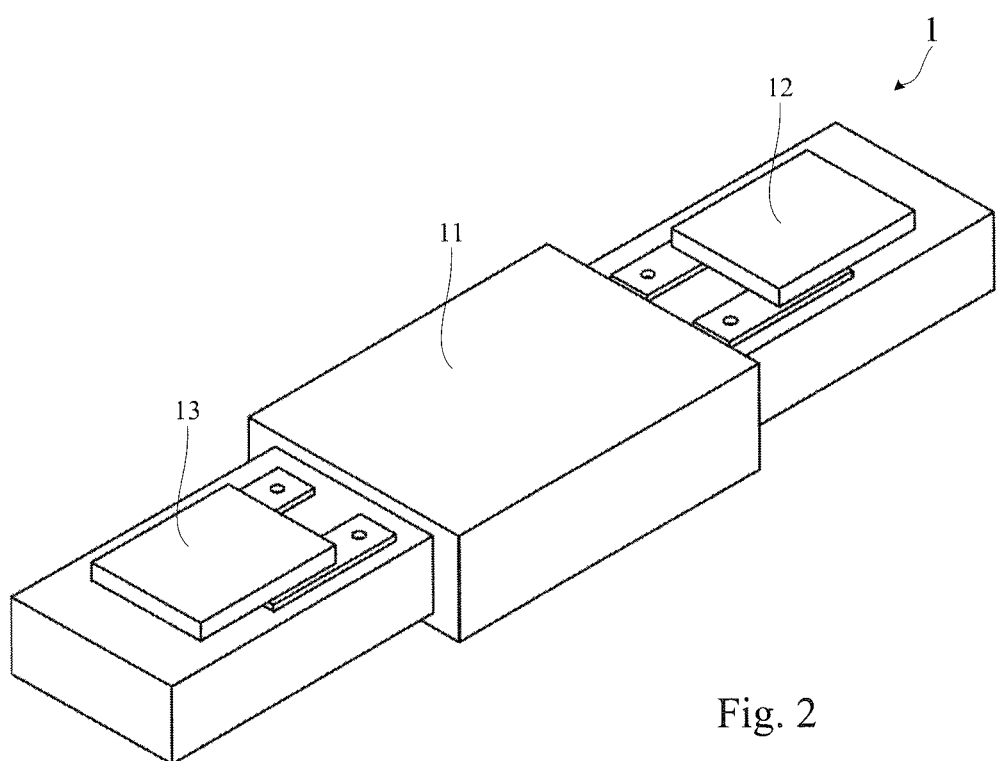
FIG. 2 illustrates a schematic structure diagram of a power converter including the traditional planar transformer.

Especially, when the magnetic core group 31 is the magnetic core group of the third, the fourth, the fifth, the sixth, the seventh or the eighth embodiment, the effect is more apparent. It is proved by experiments that one special planar transformer with the structure shown in FIG. 2 has a total leakage inductance of 1.13 µH. The leakage inductance consists of an internal window leakage inductance and the leakage inductance generated by the secondary side outgoing wire, in which the window leakage inductance is 0.72 µH. By adoption of this embodiment, the total leakage inductance is decreased to 0.77 µH. That is, the leakage inductance of the secondary side outgoing wire is decreased from 0.41 µH to 0.05 µH, and the leakage inductance generated by the secondary side outgoing wire is nearly eliminated.

It should be noted that the embodiments above mainly improve the layout of the secondary side circuit module 32, so as to have an overlapping projection area on the first plane with the winding 312. However, in some other embodiments, the primary side circuit module 33 may be similarly treated so as to have an overlapping projection area on the first plane with the winding 312.

Figure 13:
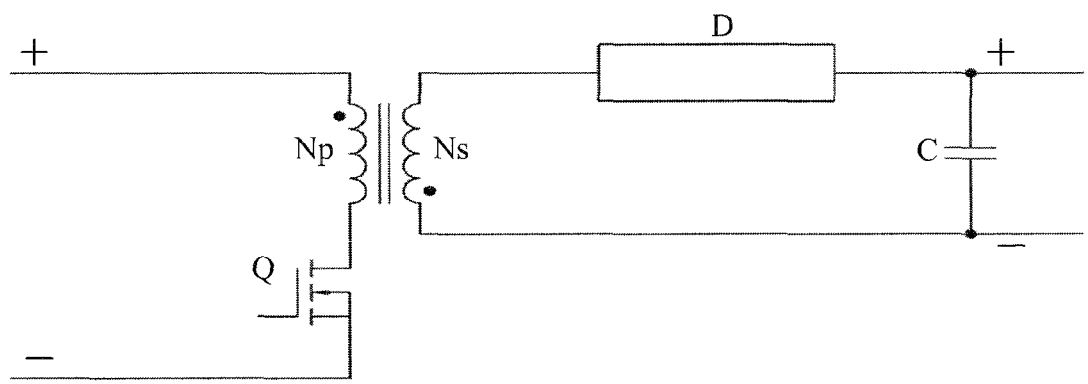
FIG. 13 illustrates a schematic circuit diagram of the transformer of the eleventh embodiment of the present disclosure.

The Eleventh Embodiment:

FIG. 13 illustrates a schematic circuit diagram of the transformer of the eleventh embodiment of the present disclosure.

As shown in FIG. 13, the primary side circuit includes a primary winding Np and a switching transistor Q; and the secondary side circuit includes a secondary winding Ns, a switching device D (such as a switching diode) and a capacitor C.

The embodiments 1-10 are applicable for the flyback transformer circuit shown in FIG. 13. Due to the decrease of the leakage inductance, the efficiency of the flyback transformer can be improved more effectively, a peak voltage of the switching transistor Q at the primary side is decreased at the turn-off time, and the switching transistor Q at the primary side is prevented from being broken down.

It can be seen from the above that, by changing the outgoing wire structures of the secondary side circuit module, the primary circuit module and the transformer module and the structure of the magnetic core group, the converter of the present disclosure decreases the energy stored in the magnetic field generated by the secondary side outgoing wire loop and the primary side outgoing wire loop, thereby decreasing the leakage inductance generated by the secondary side outgoing wire loop and the primary side outgoing wire loop.

Although the present disclosure has been disclosed with reference to the above embodiments, these embodiments are not intended to limit the present disclosure. It will be apparent to those skilled in the art that various modifications and variations can be made without departing from the scope or spirit of the present disclosure. Therefore, the scope of the present disclosure shall be defined by the appended claims.

What is claimed is:

1. A converter, comprising:
   a transformer module comprising a magnetic core group and a winding, wherein the winding comprises a primary winding and a secondary winding, and the winding is installed on the magnetic core group;
   a primary side circuit module coupled to the primary winding of the transformer module, wherein two ends of the primary winding are respectively coupled with the primary side circuit module by a primary side outgoing wire, the primary side outgoing wire comprises a primary side internal layer outgoing wire, a primary side outgoing wire hole and a primary side external layer outgoing wire, the primary side internal layer outgoing wire is electrically connected with the primary side external layer outgoing wire through the primary side outgoing wire hole; and
   a secondary side circuit module coupled to the secondary winding of the transformer module, wherein two ends of the secondary winding are respectively coupled with the secondary side circuit module by a secondary side outgoing wire, the secondary side outgoing wire comprises a secondary side internal layer outgoing wire, a secondary side outgoing wire hole and a secondary side external layer outgoing wire, and the secondary side internal layer outgoing wire is electrically connected with the secondary side external layer outgoing wire through the secondary side outgoing wire hole;
   wherein the primary side circuit module or the secondary side circuit module has an overlapping vertical projection area on a first plane with the winding of the transformer module, and the first plane is a plane in a horizontal direction of the winding.

2. The converter of claim 1, wherein the transformer module is a planar transformer.

3. The converter of claim 1, wherein the magnetic core group comprises a first magnetic core component and a corresponding second magnetic core component, the first magnetic core component has a magnetic core center pillar, a magnetic core cover plate, a first side pillar, a second side pillar, a primary side opening and a secondary side opening, the primary side opening and the secondary side opening are separately located on two ends of the first side pillar and the second side pillar, and the winding is installed between the first magnetic core component and the second magnetic core component and further is set on the magnetic core center pillar.

4. The converter of claim 3, wherein a vertical projection area of the first magnetic core component or the second magnetic core component on the first plane has at least one non-covering area which does not cover the vertical projection area of the winding on the first plane, so that at least one part of the primary side circuit module or the secondary side circuit module is vertically projected within the non-covering area and has the overlapping vertical projection area on the first plane with the winding.

5. The converter of claim 4, wherein when the vertical projection area of the first magnetic core component on the first plane has at least one non-covering area which does not cover the vertical projection area of the winding on the first plane, the magnetic core cover plate of the first magnetic core component has a thickness greater than that of the second magnetic core component.

6. The converter of claim 4, wherein when the vertical projection area of the second magnetic core component on the first plane has at least one non-covering area which does not cover the vertical projection area of the winding on the first plane, the magnetic core cover plate of the first magnetic core component has a thickness smaller than that of the second magnetic core component.

7. The converter of claim 3, wherein the primary side opening is asymmetrical with the secondary side opening with respect to the magnetic core center pillar.

8. The converter of claim 3, wherein a vertical projection areas of both the first magnetic core component and the second magnetic core component on the first plane have at least one non-covering area which does not cover the vertical projection area of the winding on the first plane, so that at least one part of the primary side circuit module or the secondary side circuit module is vertically projected within the non-covering area and has the overlapping vertical projection area on the first plane with the winding.

9. The converter of claim 8, wherein the first magnetic core component and the second magnetic core component are not overlapped in the vertical projection area on the first plane.

10. The converter of claim 8, wherein the first magnetic core component and the second magnetic core component are overlapped in the vertical projection area on the first plane.

11. The converter of claim 10, wherein the first side pillar is asymmetrical with the second side pillar with respect to the magnetic core center pillar.

12. The converter of claim 11, wherein the first side pillar between the primary side opening and the secondary side opening is longer than the second side pillar.

13. The converter of claim 10, wherein the first magnetic core component and the second magnetic core component are arc shaped inwardly along the primary side opening or the secondary side opening.

14. The converter of claim 3, wherein the vertical projection areas of the first magnetic core component and the second magnetic core component on the first plane cover the vertical projection area of the winding on the first plane, the first magnetic core component or the second magnetic core component has a groove, the groove has an overlapping vertical projection area on the first plane with the winding, and one end of the primary side circuit module or the secondary side circuit module is accommodated in the groove.

15. The converter of claim 1, wherein the primary side outgoing wire hole is set in an area between the primary winding and the magnetic core center pillar, in an area of the primary winding or on an external area of the primary winding; and the secondary side outgoing wire hole is set in an area between the secondary winding and the magnetic core center pillar, in an area of the secondary winding or on an external area of the secondary winding.

16. The converter of claim 15, wherein when the primary side outgoing wire hole is set on the external area of the primary winding, an element sensitive to leakage inductances in the primary side circuit module is laid at one side of a direction of the primary side outgoing wire hole close to the magnetic core center pillar;

when the secondary side outgoing wire hole is set on the external area of the secondary winding, an element of the secondary side circuit module sensitive to the leakage inductances is laid at one side of the secondary side outgoing wire hole close to the magnetic core center pillar.

17. The converter of claim 1, wherein the primary winding and the secondary winding are PCB windings.

18. The converter of claim 1, wherein the converter is a flyback converter.

* * * * *